United States Patent [19]
Hallanger et al.

[11] 3,967,633
[45] July 6, 1976

[54] GAS VENT SYSTEM FOR OPERATION IN ANY ARBITRARY SPATIAL ORIENTATION

[75] Inventors: Lawrence W. Hallanger, Oxnard; Leroy W. Tucker, Camarillo, both of Calif.

[73] Assignee: The United States of America as represented by the Secretary of the Navy, Washington, D.C.

[22] Filed: May 22, 1975

[21] Appl. No.: 580,078

[52] U.S. Cl. .................................. 137/43; 137/44; 137/202; 137/578; 137/587
[51] Int. Cl.² ........................................ F16K 17/36
[58] Field of Search ............... 137/43, 44, 202, 578, 137/587

[56] References Cited
UNITED STATES PATENTS
1,032,458  7/1912  White ............................ 137/578 X
2,536,052  1/1951  Gohlke ........................... 137/578 X FOREIGN PATENTS OR APPLICATIONS
307,653    10/1919  Germany .......................... 137/202
1,252,992  10/1967  Germany .......................... 137/202
996,413    6/1965   United Kingdom .................. 137/43

Primary Examiner—Robert G. Nilson
Attorney, Agent, or Firm—Richard S. Sciascia; Joseph M. St.Amand

[57] ABSTRACT

A gas vent tube for removing gas from a container while minimizing loss of liquids. The vent is mounted in a cylindrical container on a 360° rotating joint and has a buoyant material attached to always maintain the vent in an upright position. The pickup tube also has a buoyancy closure valve to prevent the loss of liquid when the end of the pickup tube is not in a gas, and may be provided with a check valve when the container is submerged in a second liquid to prevent the intrusion of the second liquid into the container.

9 Claims, 5 Drawing Figures

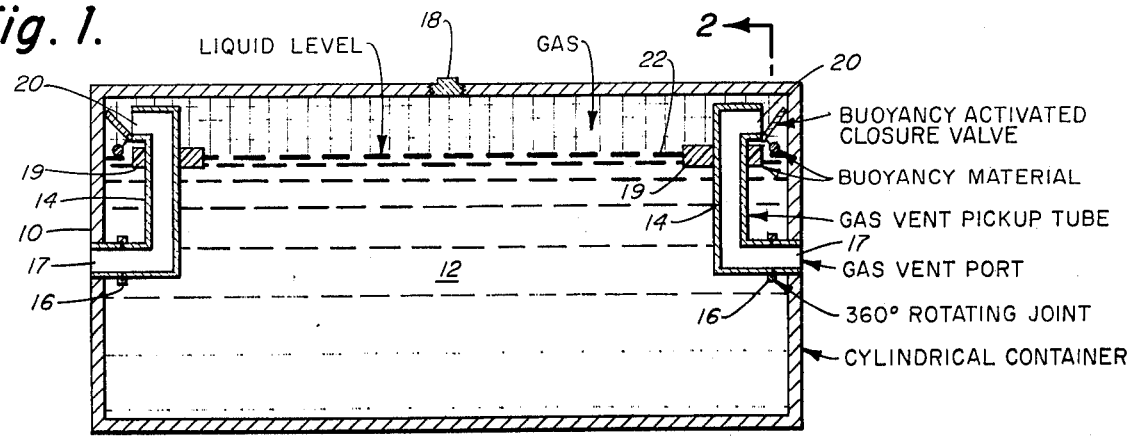
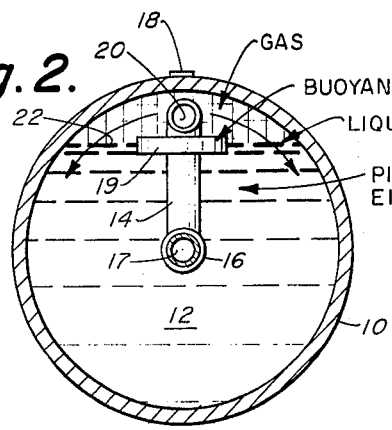
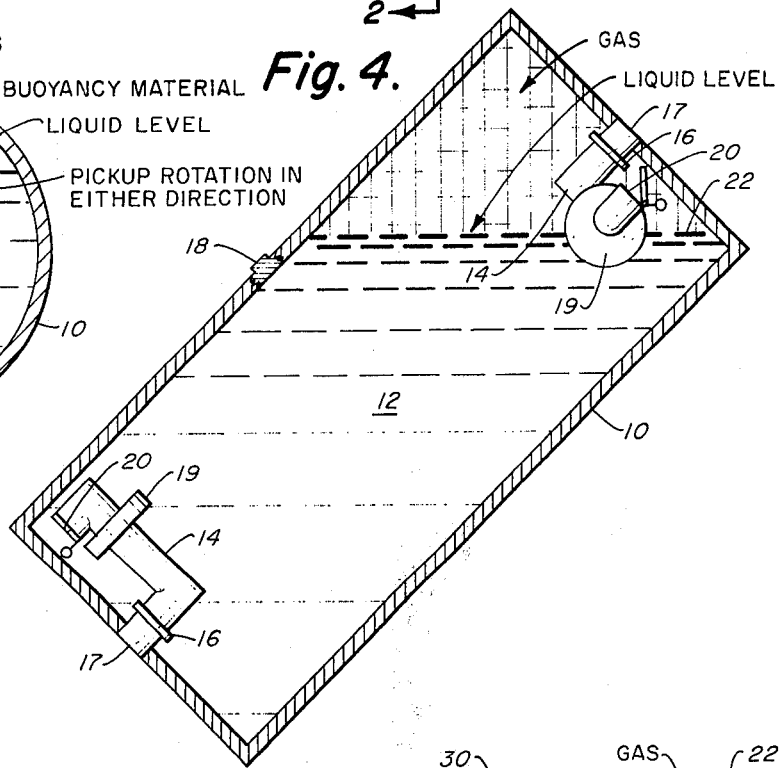
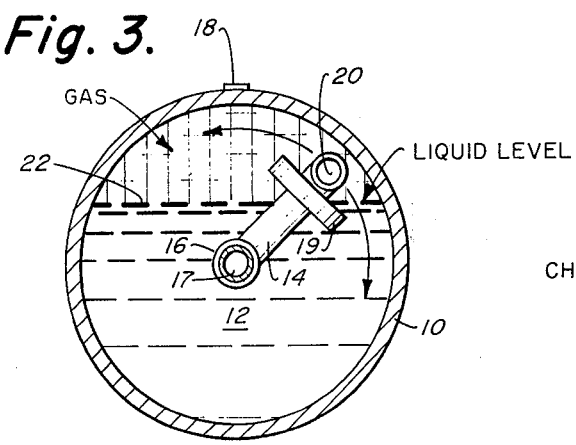
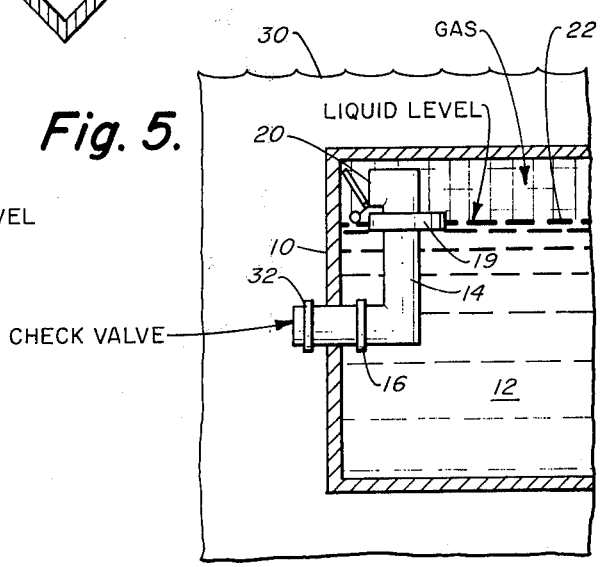

GAS VENT SYSTEM FOR OPERATION IN ANY ARBITRARY SPATIAL ORIENTATION

BACKGROUND OF THE INVENTION

The present invention is for a gas vent pickup tube intake that automatically seeks the high point or gas-filled portion in a container that is normally liquid filled. Old methods utilize fixed location vent valves or floating valves which are not easily adapted for use in containers that may move and assume any arbitrary spatial orientation. Prior devices are either limited to container of fixed orientation or inherently limited to low gas flow rates.

The gas vent system as herein described operates to vent high volumes of gas at high flow rates, such as on the order of the container volume in the period of one minute, while minimizing loss of liquid from the container. This system also is suitable for use where the tank being vented is immersed in a second liquid and a check valve is provided to prevent intrusion of the second (external) liquid into the tank.

This device is particularly useful in any liquid filled device in which there is gas generation and where removal of the gas may be a problem. An electrochemical energy source which utilizes an energy cell with a seawater electrolyte and which generates large quantities of gas can utilize a gas vent device as disclosed herein. Examples of such energy sources are disclosed in U.S. Pat. Application Ser. No. 507,645 for "Electrochemical Energy Source for Diver Suit Heating," now U.S. Pat. No. 3,884,216 issued 20 May 1975 and in U.S. Pat. Application Ser. No. 507,918 for "Heat Source for Curing Underwater Adhesives," now U.S. Pat. No. 3,906,926 issued 23, Sept. 1975.

The up-seeking gas venting system of the present invention requires that only a relatively small portion of the interior volume of the tank be kept clear of mechanical obstructions for the system to provide full venting capability in all orientations.

SUMMARY OF THE INVENTION

In this invention a gas exhaust vent is mounted on a 360° rotating joint at one end of a cylindrical container. The vent tube is buoyant to maintain it in an upward position and has a closure to prevent loss of liquid in case the intake end of the vent is submerged. A check valve may be used to prevent liquids from entering the container if it is submerged in another liquid. By using two such vents, gas exhaust is assured regardless of the spatial orientation of the liquid container.

BRIEF DESCRIPTION OF THE DRAWINGS

FIG. 1 is a cross-sectional side view of a preferred embodiment of the invention and illustrates a liquid container having a gas vent at each end thereof.

FIG. 2 is a cross-sectional end view taken along section 2—2 of FIG. 1.

FIG. 3 shows a cross-sectional view similar to that of FIG. 2, but showing the gas pickup tube when the liquid in the container is at a lower level.

FIG. 4 illustrates a tank as in FIG. 1 in an arbitrary spatial orientation.

FIG. 5 is a cross-sectional partial view of a submerged tank including a check valve to prevent intrusion of outside liquid.

DETAILED DESCRIPTION OF THE PREFERRED EMBODIMENT

Referring to FIGS. 1 and 2, a container 10 which is normally filled with a liquid 12 has a gas pickup tube 14 pivotally mounted by means of a 360° rotating joint 16 about a gas venting port 17 in the end of container 10. Rotating joint 16 being leakproof thus permits complete radial rotation of tube 14 about port 17 without allowing loss or passage of liquid through the joint itself. Container 10 can be provided with any suitable means for adding to or removing liquid therefrom, such as a plug 18. When used with a cylindrical container, as shown, it is preferable that the gas venting port 17 and rotating joint 16 be located on the container wall at the center of the circular end. Gas pickup tube 14 is provided with a float 19 of buoyant material at the gas pickup or intake end 20 (i.e., upper end) or tube 14 may be made entirely from a buoyant material tending to always keep the tube upright and keep the gas intake end 20 above the level 22 of the liquid in the container. Rotating joint 16 allows pivotal movement of tube 14 such that it can move freely in a clockwise or counterclockwise direction as the level 22 of the liquid in the container 10 changes. FIGS. 2 and 3 illustrate the movement of gas pickup tube 14. As shown in FIG. 3, as the level in the container drops, the vent tube 14 moves radially downward while keeping intake end 20 above liquid level 22. The free movement of tube 14 and float 19 keeps the gas intake end 20 above the liquid level 22 within the limitations of the tube length, pivot point and geometry of the container 10 used.

Gas which accumulates above the liquid in the container thus can pass through tube 14 and venting port 17 to the exterior of the container where it can be transferred to another area via a conduit or the like, not shown, or disposed of as desired.

Gas intake end 20 of the pickup tube 14 is provided with an end closure valve 24, which can be float operated as shown, to prevent loss of liquid 12 from the container when the intake end is below the level 22 of the liquid, as in the lower end of FIG. 4, which shows intake end 20 submerged. Any suitable closure valve can be used for this purpose to prevent the undesired flow of liquid 12 from the container.

As illustrated in FIGS. 1 and 4, a gas pickup tube 14 and venting port 17 is provided at each end of an elongated container. This permits gas venting in any arbitrary spatial orientation, since regardless of the container position, the gas intake end 20 of at least one of the pickup tubes 14 will always be above liquid level 22, as is illustrated in FIG. 4. Also, in instances where the tank or container 10 is of irregular shape, two or more venting ports 17 and gas pickup tubes 14 may be desired. The system described above and illustrated in the drawings provides a positive means for keeping the gas intake end above the highest liquid level point within a normally liquid-filled container. This permits maximum gas removal while minimizing any possibility of liquid loss to practically zero.

The above-described system can also be used in an undersea or similar environment where the liquid container 10 is submerged in another liquid 30, such as seawater, oil, etc., as shown in FIG. 5. When container 10 is submerged in a liquid environment, venting port 17 is provided with a check valve 32 which allows gas to exit from the container but prevents the outside liquid 30 from entering the container via port 17 and vent tube 14. In an undersea environment, any gas generated within a container can readily be vented therefrom (usually under pressure) using the present system without permitting entry of seawater into the container.

Obviously many modifications and variations of the present invention are possible in light of the above teachings. It is therefore to be understood that within the scope of the appended claims the invention may be practiced otherwise than as specifically desired.

We claim:

1. A vent system operable for exhausting accumulated gas from above a liquid in an enclosed liquid container regardless of the arbitrary spatial orientation the container may be positioned, comprising:
   a. an enclosed container for liquid;
   b. a gas vent port located centrally in each of at least two opposite far walls of said container;
   c. a floatable gas venting tube for each said vent port respectively; each venting tube having one end attached to a respective gas vent port by means of a leakproof rotating joint and being operable to rotate radially 360° in either direction about said vent port, the opposite end of each said venting tube being the gas intake end thereof;
   d. buoyant means for maintaining the gas intake end of each said gas venting tube above the level of any liquid in said container, within the limitation of the length of each said tube as the orientation of said container changes;
   e. valve means on the gas intake end of said respective venting tubes operable to close and prevent the intake of any liquid into said tubes whenever the intake end is below the level of any liquid in said container.

2. A system as in claim 1 wherein said venting tube is made from a buoyant material.

3. A system as in claim 1 wherein said container is operable to be submerged in and surrounded by another liquid and each said vent port is provided with a valve means for preventing the influx of liquid from outside said container to the inside thereof via said port and venting tube.

4. A system as in claim 3 wherein said valve means which prevents the influx of liquid from outside said container also permits the exhausting of gas under pressure from within said container.

5. A system as in claim 1 wherein several vent ports and venting tubes are used on various walls of said container.

6. A system as in claim 1 wherein said container is cylindrical and the far walls are the circular ends thereof.

7. A system as in claim 1 wherein only one gas vent port and venting tube are required where said container is positioned with its longitudinal axis in a horizontal plane.

8. A system as in claim 1 wherein the gas intake end of at least one of said vent tubes is operable to extend into the uppermost region of the interior of said container.

9. A system as in claim 1 wherein the dimensions of said vent port and venting tube are such as to vent high volumes of gas at high flow rates.

* * * * *